United States Patent [19]

Dickens et al.

[11] Patent Number: 5,134,265
[45] Date of Patent: Jul. 28, 1992

[54] RAPID HEATING, UNIFORM, HIGHLY EFFICIENT GRIDDLE

[75] Inventors: David Dickens, Sunnyvale; James M. Taylor, Mountain View; Fern Mandelbaum, Menlo Park; Frank A. Doljack, Pleasanton, all of Calif.

[73] Assignee: Metcal, Inc., Menlo Park, Calif.

[21] Appl. No.: 480,895

[22] Filed: Feb. 16, 1990

[51] Int. Cl.$^5$ .............................................. H05B 6/02
[52] U.S. Cl. ........................ 219/10.491; 219/10.493; 219/10.67; 219/10.71; 219/10.79; 99/DIG. 14; 99/451
[58] Field of Search ...................... 219/10.491, 10.493, 219/10.71, 10.75, 10.79, 10.67; 99/DIG. 14, 451

[56] References Cited

U.S. PATENT DOCUMENTS

| | | | |
|---|---|---|---|
| 3,684,853 | 8/1977 | Welch et al. | 219/10.49 |
| 3,843,857 | 10/1974 | Cunningham | 219/10.49 |
| 3,906,181 | 9/1975 | Hibino et al. | 219/10.49 |
| 3,928,744 | 12/1975 | Hibino et al. | 219/10.49 |
| 3,966,426 | 6/1976 | McCoy et al. | 29/196.2 |
| 3,989,410 | 8/1975 | Peter, Jr. | 219/10.49 |
| 4,074,101 | 12/1978 | Kiuchi et al. | 219/10.49 R |
| 4,256,945 | 3/1981 | Carter et al. | 219/10.75 |
| 4,277,667 | 7/1981 | Kiuchi | 219/10.49 R |
| 4,296,295 | 10/1981 | Kiuchi | 219/10.493 |
| 4,629,843 | 12/1986 | Kato et al. | 219/10.493 |
| 4,646,935 | 3/1987 | Ulam | 219/10.79 |
| 4,695,713 | 9/1987 | Krumme | 219/553 |
| 4,701,587 | 10/1987 | Carter et al. | 219/10.75 |
| 4,752,673 | 6/1988 | Krumme | 219/553 |
| 4,833,288 | 5/1989 | Poumey | 219/10.493 |
| 4,922,079 | 5/1990 | Bowen et al. | 219/415 |

FOREIGN PATENT DOCUMENTS

| | | | |
|---|---|---|---|
| 2527916 | 6/1982 | France . | |
| 61-16615 | 5/1986 | Japan . | |
| 1157711 | 7/1969 | United Kingdom | 219/10.493 |

OTHER PUBLICATIONS

The Maxim Company Brochure for an Automatic Electric Crepemaker on Electric Brunch Pan, and a Warming Tray, Aug., 1985.
All-Clad Metalcrafters Brochure.

Primary Examiner—Bruce A. Reynolds
Assistant Examiner—Tu Hoang
Attorney, Agent, or Firm—Burns, Doane, Swecker & Mathis

[57] ABSTRACT

A basically commercially fast heat highly efficient griddle has interchangeable griddle plates including magnetically permeable materials having Curie temperatures which may be the same or different to provide different cooking temperatures, the plates being heated by induction coils providing sufficient energy to heat the plates to their effective Curie temperatures in the presence of loads and of a design to maintain a uniform cooking temperature across the griddle plate to within less than an inch of the edges of the plates. The plates may be placed in an enhanced idle condition at cooking temperature by placing a cover over the plates or region of a plate not in use. Increased efficiency is further due to an insulator blanket placed between the griddle plates and coils.

25 Claims, 4 Drawing Sheets

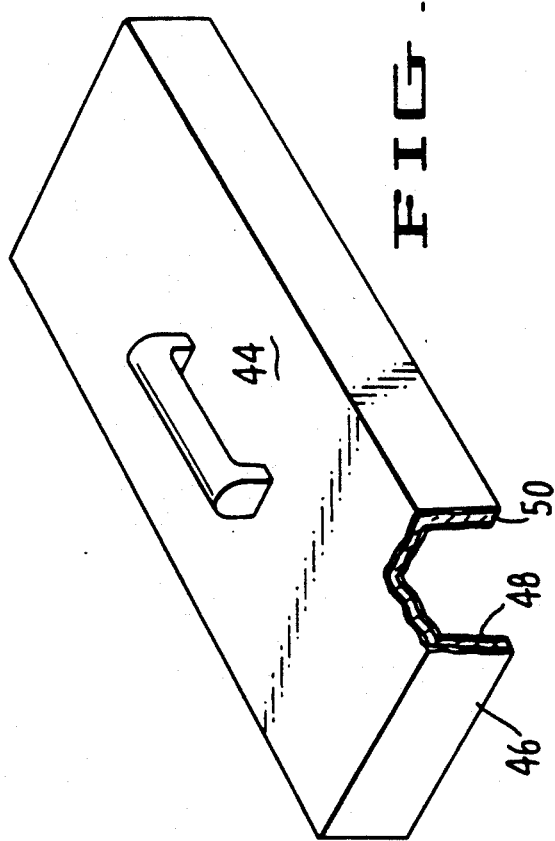
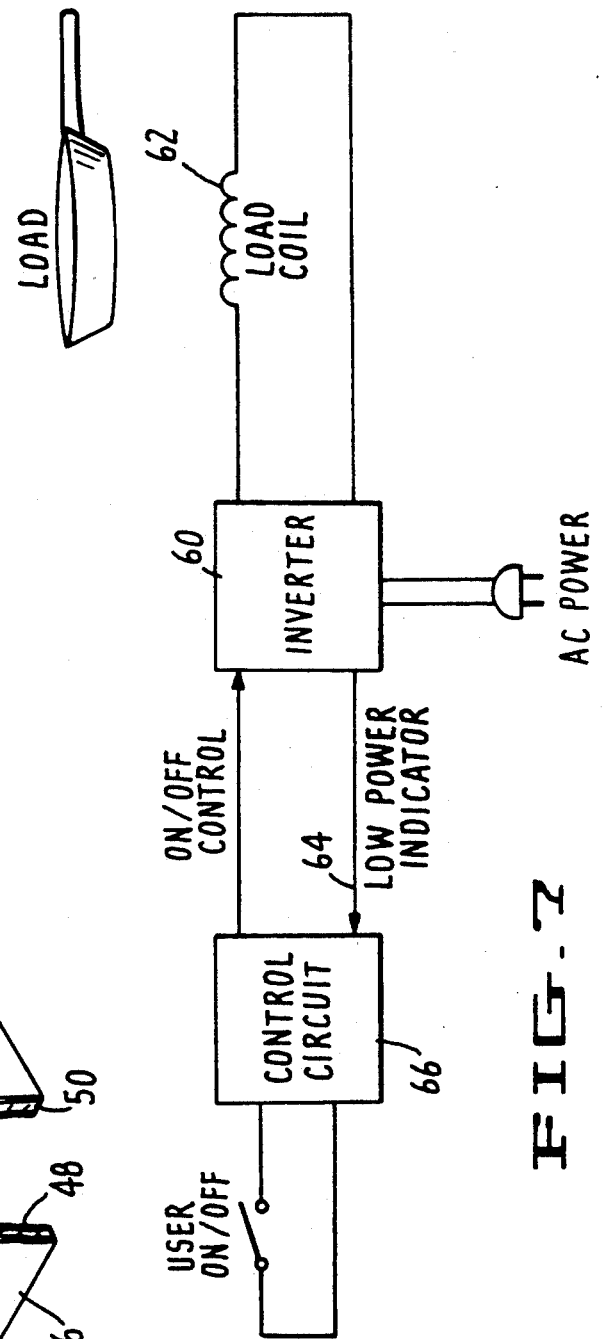

RAPID HEATING, UNIFORM, HIGHLY EFFICIENT GRIDDLE

TECHNICAL FIELD

The present invention relates essentially to commercial griddles and more particularly to griddles employing magnetically permeable griddle plates heated by induction coils to their Curie temperatures which may vary from plate to plate or from one surface of the griddle plate to the other.

BACKGROUND OF THE INVENTION

Griddles are one of the major cooking appliances in commercial kitchens, particularly in a majority of the fast food and full service chain restaurants. The prior art griddles are either gas or electric powered and typically have one heating element, one thermocouple and one thermostat per linear foot thus permitting wide temperature variations between heating elements. Literally power is pushed into the food.

The problems with the prior art griddles are numerous. Such griddles typically have a 70° F. temperature variation across their surfaces, they cannot deliver power to specific incremental areas, thus cold areas may call for heat and hot areas as a result are overheated or vice versa. The heat-up time from turn-on is typically 20 minutes and the griddles have a slow response time to changes in temperatures caused by change of load. Such griddles are difficult to clean; the relatively large surface areas cannot be removed for cleaning. And further, the conventional griddle does not provide cooking temperatures within three inches of its periphery.

There are also prior art consumer oriented induction cooking stoves with special pots. The pots have ferromagnetic bottoms and the stove has induction coils. These devices have coils that do not provide uniform temperature across the bottom of the pot or pan and provide minimum shielding of R.F. radiation. These coils are not designed for use in plate technology or large size pots.

Such a device is found in French Patent No. 2,527,916. This patent discloses a pot or pan with a ferromagnetic bottom. Several pots are provided each with a ferromagnetic bottom of different Curie temperatures whereby different cooking temperatures are provided.

BRIEF DESCRIPTION OF THE PRESENT INVENTION

In accordance with the present invention, a plurality of interchangeable griddle plates incorporating magnetically permeable, that is, high mu material such as Alloy 34, Alloy 36 and the like, are subjected to an essentially uniform alternating magnetic field by induction coils to heat the griddle plates to their effective Curie temperatures at which temperature the plates become essentially non-magnetic and heating is materially reduced. The temperature falls and the plates reacquire their magnetic properties and start heating again whereby the plates maintain a quite constant temperature at about their effective Curie temperatures.

Uniformity of temperature across the plates is insured by a specific design of the induction coils and related structure that maintains a magnetic field across the griddle plates such that each region of the plates responds uniformly to a change in load at that region. Measurements of temperature across the plates showed variations of about ±10° F. These small variations result from the fact that the plates respond incrementally to changes in load. Thus if batter is placed on an area of a plate, that area has its temperature reduced, it becomes highly magnetic and generates heat at a fast rate whereas immediately adjacent areas unaffected by changes in load continue to idle; that is, cycle over a short range about the effective Curie temperature.

Griddle plates of different Curie temperatures may be used concurrently. Thus a griddle having several different closely controlled temperatures at the same time is provided. Each griddle plate is fabricated so as to prevent unnecessary stray radiation and by covering different regions of a griddle plate with different high mu materials one plate can provide multiple temperatures. Thus with only a few griddle plates many different cooking temperatures may be provided. In fact by using half size plates it is possible to provide six different highly regulated cooking temperatures at the same time or by using different high mu materials on both surfaces of the plate, three full size plates can provide six different temperatures.

If the griddle plate employs different Curie temperatures on opposite surfaces the operation is disclosed in U.S. Pat. No. 4,695,713. If a non-magnetic, low-resistance layer such as copper is disposed between the two ferromagnetic surfaces, the operation is described in U.S. Pat. No. 4,752,673. Shielding may be and is provided by following the teachings of U.S. Pat. No. 4,701,587. The teachings of these patents are incorporated by reference.

The griddle plates take about five minutes to reach maximum temperature from a cold start. This maximum temperature can be maintained at little cost of energy by placing a cover over all areas not being used. Heat loss is minimized particularly if a poor heat conductive material is employed for the cover or covers. Further an insulating pad may be disposed between the coils and the griddle plates to, among other things, reduce heat loss from the griddle plates. The combination of these two features provide an unusually efficient system, the insulating pad reducing heat loss at all times and the cover during non-cooking intervals.

The induction coils are supplied with a constant alternating current to maintain uniform response to the energy input. The more uniform the current the better the temperature regulation. For the sake of analysis the griddle plates are considered to reflect resistance into the coils and under these circumstances the regulation is governed by the equation $$\frac{\Delta |I|}{|I|} < -1/2 \frac{\Delta R}{R}$$

where $|I|$ is current and R is the reflected resistance. If the current is held constant regulation is good. If the current is permitted to rise, the regulation becomes poorer as the value of the left side of the equation approaches the right side and the system fails if the value of the left side of the equation exceeds the value of the right side.

The term "effective Curie temperature" is the temperature at which a material becomes, for purposes of this invention, essentially non-magnetic. Such temperature may be as little as 1° C. or as much as 100° C. less than absolute Curie temperature depending upon the material employed.

Reference is made to high mu materials or magnetically permeable materials or the magnetic permeability of materials. These materials provide for a high degree of concentration of magnetic flux in them as long as they are below their effective Curie temperatures. The flux produces eddy current and hysteresis losses as well as resistive losses. Such materials may be principally ferromagnetic or ferrimagnetic but other materials whose degree of magnetic permeability varies with temperature are also available.

OBJECTS OF THE INVENTION

It is an object of the present invention to provide a hot griddle system wherein griddle plates are heated to a uniform essentially constant temperature across their surfaces and which are heated quickly to cooking temperatures.

It is another object of the present invention to provide interchangeable griddle plates which provide different fixed cooking temperatures.

It is yet another object of the present invention to provide induction coils and related structure for heating magnetically permeable griddle plates to uniform temperatures substantially across their entire surfaces.

It is still another object of the present invention to provide griddle plates which shield the environment from excessive magnetic fields.

Yet another object of the present invention is to provide a griddle plate or plates each of which can provide at least two different cooking temperatures.

Still another object of the present invention is to provide a highly efficient griddle structure employing heat insulation for under the griddle plates and a cover that may be used during non-cooking intervals so that the plates are maintained essentially at about effective Curie temperature with the expenditure of little energy.

BRIEF DESCRIPTION OF THE DRAWINGS

FIG. 6 is a view in cross-section of a cover for the griddle plates; and

FIG. 7 is a diagram of the control circuit employed with the present invention.

DETAILED DESCRIPTION OF THE INVENTION

Figure 1:
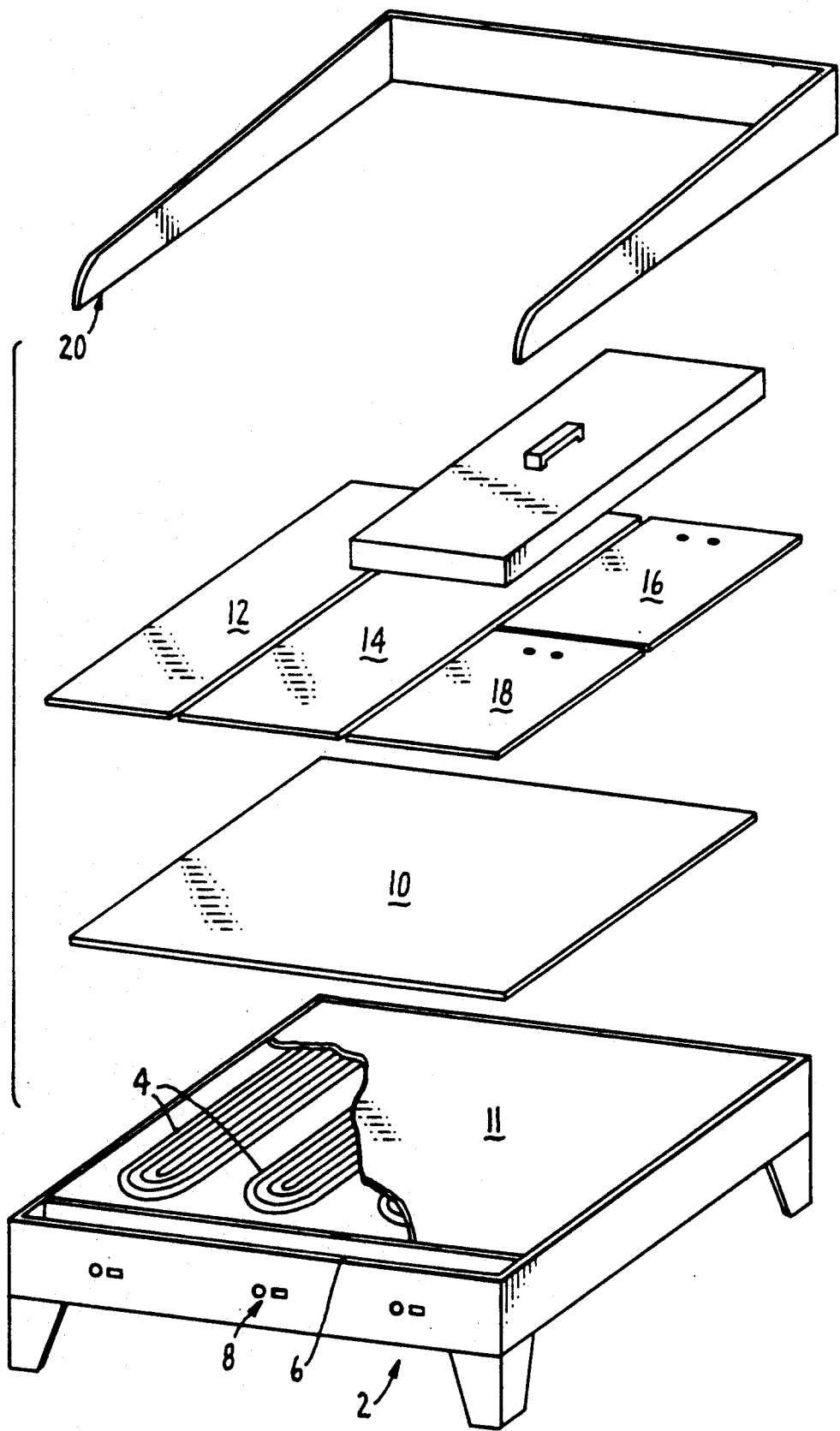
FIG. 1 is an exploded view of the griddle system of the present invention.

Referring specifically to FIG. 1 of the accompanying drawings, there is illustrated an exploded view of the griddle system of the present invention. The system comprises a stand 2 which in the embodiment illustrated supports three induction coils 4 identical in construction. The stand has a grease trap 6 along its front horizontal surface and on the vertical front surface has controls 8, one for each coil 4.

Removably disposed over the coils 4 is a coil insulator 11 that serves several functions; it insulates the coil from extreme temperatures, it minimizes heat loss from the griddle plates to be described, and it has sound absorption properties that helps reduce noise often associated with magnetic induction systems. The insulator 11 is a refractory fiber blanket formed from very pure alumina, silica or other refractory oxides. The material presently being employed is a non-woven glass.

Disposed above and in contact with the insulator 11 is a griddle surface 10 fabricated from glass or a light weight, high temperature polymer. The griddle surface 10 serves to deflect grease into the grease trap 6 and prevent it from falling on the coils 4.

Disposed above and resting on the griddle surface 10 are removable griddle plates 12, 14, 16 and 18 which are fabricated from high mu materials. All four of the plates may have the same Curie temperature, different temperatures or any combination in between depending upon what foods are to be cooked on the plates. To complete the structure, a removable splash guard 20 is disposed about the back and two sides of the top surface of the stand 2. In the particular embodiment discussed herein a full size griddle plate is about 1 foot by 2 feet.

The power supply (not illustrated) is held in the base of the stand 2 under the coils. It supplies 1300 watts per square foot of constant alternating current at 22 KHz or more but preferably under 50 KHz. The power work unit employed was a power supply taken from a Sanyo induction cooker Model No. 564.4498511. The Sanyo control board is replaced by the circuitry described below relative to FIG. 7.

Figure 2:
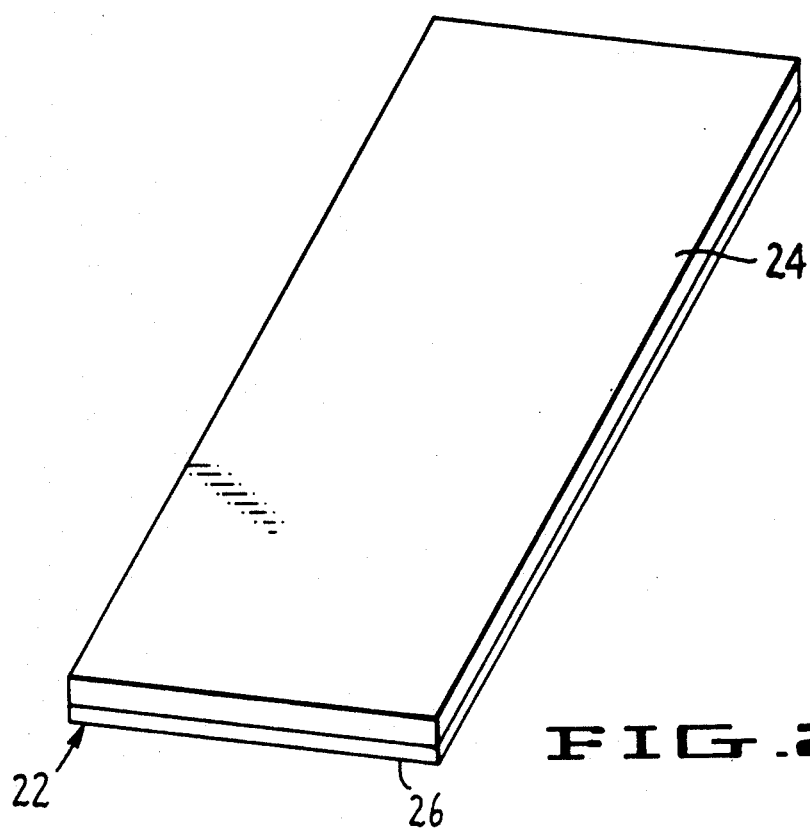
FIG. 2 is a perspective view of one embodiment of a griddle plate.

As previously indicated, the plates 12, 14, 16 and 18 are removable and each one can have a different Curie temperature. Referring to FIG. 2, each plate 22 is quite thin and is made of a sheet of stainless steel 24 that, in this instance, is 0.125 inch thick with a bottom layer of high mu material 26 about 0.035 inch thick. The plates are easily cleaned. The use of an alloy layer that is 0.035 inch thick (about 5 skin depths) at 26 MHz permits the plate to accept all available power of the power unit and causes the plate to achieve its effective Curie temperature. Since the plates and for that matter the griddle surface 10 carry no electrical components they may be immersed in water for cleaning.

The thickness of the magnetic material on the griddle plates should be such as to take all of the energy from its coil that is available and essentially isolate the surrounding area from the magnetic flux. With the aforesaid power supply frequency the magnetic material on the plate as indicated above, is 35 thousandths of an inch, this being approximately five skin depths at the frequency employed. See U.S. Pat. Nos. 4,256,945 and 4,701,587, the subjects matter thereof relating to skin depth and copper clad ferromagnetic materials being incorporated herein by reference.

Figure 3:
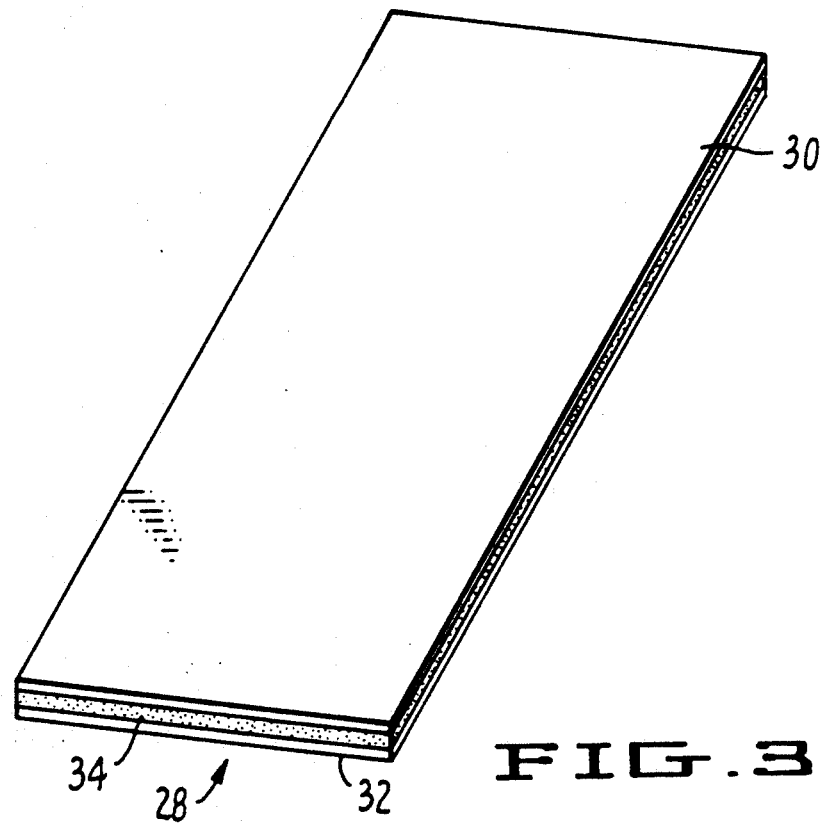
FIG. 3 is a perspective view of a tri-clad griddle plate.

Referring to FIG. 3 a tri-clad plate 28 is employed. Here the upper surface 30 is 304 stainless steel at 0.048 inch thickness, a bottom surface 32 is a nickel-iron, high mu material at a thickness of 0.035 inch and sandwiched between is a copper 101 plate 34 at a thickness of 0.075 inch. The total plate thickness is 0.153 inch thus presenting little thermal inertia but providing adequate magnetic shielding.

The plate of FIG. 3 may have both lower and upper surfaces of high mu materials of different Curie temperatures. Thus each of the plates of FIG. 1 may be a tri-clad plate with two high mu surfaces to provide as many as eight cooking temperatures with four plates. The lower surface shields the upper surface from appreciable flux so that the lower magnetic surface controls temperature. The number of griddle plates is indefinite being restricted only by the number of different cooking temperatures desired. Although there are magnetic stainless steels their Curie temperatures are quite high and therefor when a two sided magnetic griddle plate is employed both surfaces usually are iron alloys as follows:

| Alloy | Effective Curie Temperature |
|---|---|
| 31 | 75° C. |
| 31½ | 100° C. |
| 32 | 128°-136° C. |
| 34 | 164° C. |
| 36 | 223°-250° C. |
| 42 | 325°-300° C. |

These temperatures are approximate and should not be considered to be precise.

Examples of tri-clad construction are Stainless 304, cu 101 and selected alloy and Stainless 400 series, cu 101 and selected alloy. The 400 series stainless provides increased shielding over the 304 stainless. Also two temperatures in one plate can be alloy, cu 101 and alloy. A bi-clad plate can be stainless and alloy.

Figure 4:
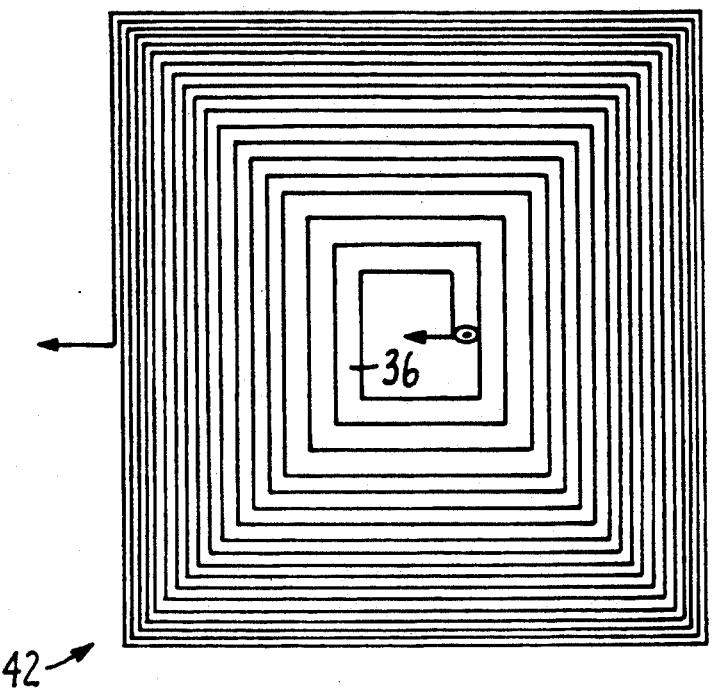
FIG. 4 is a detailed view of the coil configuration of the present invention.

Referring now to FIG. 4 of the accompanying drawings there is illustrated the coil structure of the present invention. Coil 42 is fabricated from Litz wire 36 and non-conductive rubber or plastic spacing material 38. In order to obtain a magnetic field that maintains a uniform temperature across the griddle plate surface the spacing between the turns of the Litz wire are non-uniform going from a spacing of 0.25 inch in the center of the coil to no spacing at the edges.

To be specific the Litz wire is 0.10 inch in diameter. The coil length is 37 feet 10 inches with the first two feet having a spacing of 0.25 inch between turns, the next 27 feet having 0.125 inch between turns, the next five feet having 0.103 inch between turns and the last three feet 10 inches having no spacing between turns except for the insulation over the wire.

Figure 5:
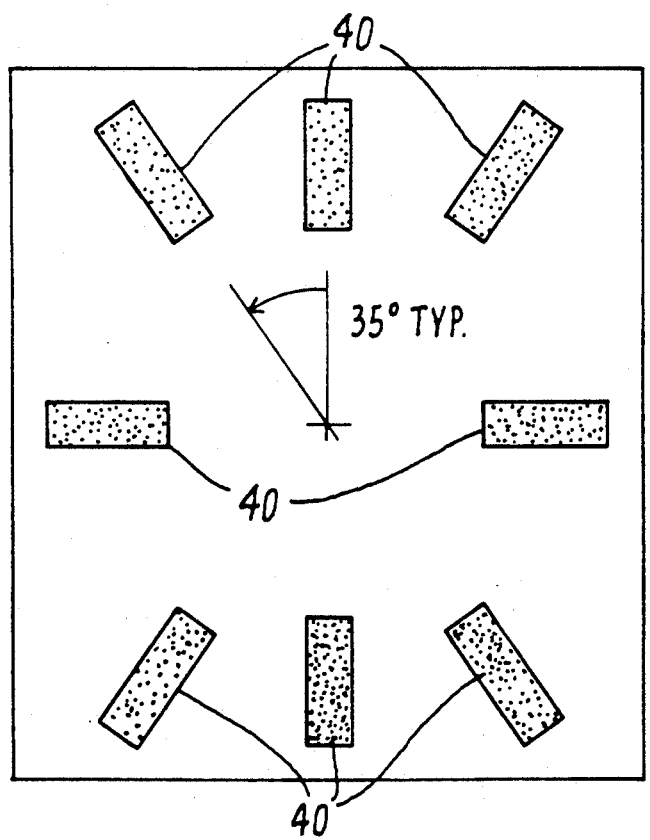
FIG. 5 is a view illustrating the arrangement of various ferrite bars under the coil structure.

To assist in producing the uniform heating in one specific embodiment, ferrite bars 40 are located as illustrated in FIG. 5 below the coils 42. The coils are rectangular, eleven inches by ten inches. Each coil has associated with it 8 ferrite bars, 2½ inches long ¾ inch wide and 0.0187 inch thick. These sizes are approximate. The bars 40 are located at each end of the horizontal and vertical centerlines of the rectangle and at each end of two lines at approximately 35° on both sides of the vertical centerline, all as illustrated in FIG. 5.

The purpose of these bars 40 is two-fold. First, the bars reduce the flux concentration under the coil 42 and increases it over the coil so as to increase the flux coupling to the magnetic material. By reducing the flux under the coils the bars assist in preventing leakage of electromagnetic radiation. A second use of the bars is to assist the coil structure in providing uniformity of temperature across a griddle plate. In most prior art griddles it is assumed that application of heat must be heavily concentrated about the edges because there is no heat source outside of the edges of the griddle whereas the center of the griddle is surrounded by heated material.

It has been found, however, that the above statement is not totally correct and that the center of the griddle is cooler than the rest of the surface if that philosophy is followed. Thus in accordance with the present invention, a small part of the coil is devoted to heating the center section of the griddle and the increased magnetic flux produced at the edges as a result of use of the ferrite bars compensates for the loss of flux diverted to the lateral central region of the griddle plate. As previously indicated, the variation in temperature across the griddle is ±10° F. to within ¼" of its edges.

Referring now to FIG. 6 of the accompanying drawings, there is illustrated in partial cross section, a cover 44 that may be used with the griddle system of the present invention. The cover 44 has inner and outer layers 46 and 48 fabricated from a heat resistant, poor heat conducting material and is a hollow structure. The outer materials used may be a liquid crystal polymer or stainless steel. Central region 50 of the cover 44 may be empty or may have a poor heat conducting fibrous filler 46 of glasswool or ceramic.

When placed on a griddle plate such as griddle plate 30 of FIG. 3, the surface of the plate is reasonably isolated from the ambient air and loss of heat is maintained quite low. The plate does not overheat because its temperature will not rise above its effective Curie temperature and thus the temperature of the griddle plate 30 cycles slowly about its effective Curie temperature and little energy is expended. A further feature that enhances the efficiency of the apparatus is the insulator 11. The insulator 11 as described above reduces heat loss at all times. When the cover 44 is used in conjunction with the insulator, the covered griddle plate is greatly isolated from the ambient and effective Curie temperature is maintained with relatively little expenditure of energy.

Referring specifically to FIG. 7 of the accompanying drawings, there is illustrated in block diagram form a control circuit for the Sanyo unit. The unit includes the Sanyo inverter 60 feeding the griddle coil 62 of the present invention. The inverter 60 feeds a low power signal over lead 64 to a control circuit 66 which in turn supplies an on/off signal to the inverter 60.

The purpose of the control is two fold, first to make available full power to the coil if a griddle plate is present and to provide low level pulses to the coil if the griddle plate is not present or a light load is present in the form of a pan or other small cooking vessel or utensil. Specifically, if the power being supplied to the load by inverter 60 indicates a griddle plate is present the inverter 60 delivers some power all the time, the level depending upon the load. If the griddle plate is not present, a low power indication is supplied to control circuit 66 which goes into a low duty cycle pulsing mode causing the delivery of only small amounts of power to the coil 62. If now a griddle plate is replaced the power absorbed rises above a predetermined threshold and the full power is again available.

In addition a thermal switch (not illustrated) is located adjacent a griddle plate to sense coil temperature. Such over temperature can occur if the power supply allows the current to rise as effective Curie temperature is achieved. In the event the value of the left side of the equation on page 4 hereof exceeds the value of the right side thereof, a run-away condition can prevail. The temperature sensing switch in such event would shut the system down.

Other improvements, modifications and embodiments will become apparent to one of ordinary skill in the art upon review of this disclosure. Such improvements, modifications and embodiments are considered to be within the scope of this invention as defined by the following claims.

We claim:

1. A system for providing a cooking surface adapted to be heated to a predetermined temperature for cooking food, comprising:
   an induction coil for generating a magnetic field; and
   a griddle plate positioned adjacent the induction coil, said griddle plate including a first layer of magnetically permeable material having a first Curie temperature and a second layer for use as a cooking surface, said magnetically permeable material being selected to produce said predetermined temperature on said cooking surface and to maintain a substantially uniform temperature across the cooking surface of said griddle plate when said magnetically permeable material is heated to its Curie temperature upon exposure to said magnetic field.

2. The system in accordance with claim 1, wherein said induction coil includes a plurality of adjacent windings, said induction coil having innermost and outermost windings, adjacent windings of said induction coil being spaced farther apart at the innermost windings than at the outermost windings.

3. The system in accordance with claim 1, wherein said griddle plate is planar.

4. The system in accordance with claim 1, wherein said griddle plate includes a layer of conductive material, said layer of conductive material having a surface defining said cooking surface.

5. The system in accordance with claim 1, including another griddle plate positioned adjacent said induction coil, said another griddle plate including a layer of magnetically permeable material having a second Curie temperature, said second Curie temperature being different from said first Curie temperature.

6. The system according to claim 1, wherein said magnetically permeable material is a nickel-iron alloy.

7. The system according to claim 3, wherein said planar griddle plate further includes:
   a third layer of material placed between said first and second layers, said material of said third layer being selected from the group consisting of copper, aluminum and alloys thereof.

8. The system according to claim 7, wherein said magnetically permeable material is a nickel-iron alloy.

9. The system according to claim 3, wherein said second layer is a cooking surface formed with a thickness less than said first layer.

10. The system according to claim 1, wherein said first and second layers are formed of magnetically permeable material.

11. The system according to claim 1, wherein said first layer is located closer to said induction coil than said second layer, said second layer having a thickness of less than or equal to about 0.035 inches.

12. The system according to claim 8, wherein said second layer is stainless steel.

13. The system according to claim 1, further comprising:
   a cover of low heat conductive material for placement over a region of the cooking surface and placing the region into an idling condition.

14. The system according to claim 1, further including:
   a thermal insulating layer located between said magnetically permeable material and said induction coil.

15. The system according to claim 1, wherein said induction coil includes a winding distribution for coupling a majority of the flux generated by said coil into an outer periphery of said magnetically permeable material.

16. The system according to claim 13, wherein said cover includes a hood-like member having spaced parallel surfaces of heat insulating material.

17. The system according to claim 1, wherein said induction coil includes at least first and second induction coils and said griddle plate includes at least first and second griddle plates situated adjacent said first and second induction coils, respectively, said first and second griddle plates having first and second Curie temperatures, respectively.

18. A three-layer composite griddle plate having a planar cooking surface comprising:
   first and second planar layers, said first layer being formed of a magnetically permeable material having a predetermined Curie temperature, and said second layer for use as a cooking surface being formed as a uniform temperature across the cooking surface of said griddle plate; and
   a third planar layer formed of another material and located between said first and second layers, said first, second and third layers being formed with different thicknesses.

19. The griddle plate according to claim 18, wherein said magnetically permeable material is a nickel-iron alloy and said third layer is formed of a material selected from the group consisting of copper, aluminum and alloys thereof.

20. The griddle plate according to claim 18, wherein said first and second layers are formed of the same magnetically permeable material.

21. The griddle plate according to claim 18, wherein said first and second layers are formed of different magnetically permeable materials.

22. A method for fabricating a three-layer composite griddle plate having a planar cooking surface comprising the steps of:
   selecting at least one magnetically permeable material having a Curie temperature for use as a first layer of the planar griddle plate;
   selecting a second layer as a cooking surface located opposite said first layer, said first and second layers having predetermined thicknesses; and
   selecting another material for use as a third layer located between said first and second layers of the planar griddle plate, said third layer having a predetermined thickness different from said predetermined thicknesses of said first and second layers, said magnetically permeable material being used to uniformly heat said second layer via said third layer for maintaining a substantially uniform temperature across the cooking surface of said griddle plate when said first layer is heated to its Curie temperature.

23. The method according to claim 22, further comprising the step of:
   selecting a single magnetically permeable material for use as said first and second layers.

24. The method according to claim 22, wherein a nickel-iron alloy is selected as said magnetically permeable material and said another material is selected from the group consisting of copper, aluminum, and alloys thereof.

25. The method according to claim 22, further comprising the step of:
   selecting said first layer as a magnetically permeable material having a thickness less than that of said second layer.

* * * * *

UNITED STATES PATENT AND TRADEMARK OFFICE
CERTIFICATE OF CORRECTION

PATENT NO. : 5,134,265

DATED : July 28, 1992

INVENTOR(S) : Dickens, Taylor, Mandelbaum and Doljack

It is certified that error appears in the above-identified patent and that said Letters Patent is hereby corrected as shown below:

In the "Abstract", line 1, delete "commercially" and insert --commercial-- therefor; and Column 8, line 19, delete "as a" and insert --to maintain a substantially-- therefor.

Signed and Sealed this

Sixteenth Day of November, 1993

Attest:

BRUCE LEHMAN

*Attesting Officer*    *Commissioner of Patents and Trademarks*